W. D. HAWLEY.
TIME RECORD SHEET.
APPLICATION FILED OCT. 9, 1905.

923,265.

Patented June 1, 1909.

WITNESSES:
Chas. H. Young.
T. Davis.

INVENTOR
William D. Hawley
BY
Key & Parsons
ATTORNEYS

UNITED STATES PATENT OFFICE.

WILLIAM D. HAWLEY, OF SYRACUSE, NEW YORK.

TIME-RECORD SHEET.

No. 923,265.   Specification of Letters Patent.   Patented June 1, 1909.

Application filed October 9, 1905. Serial No. 281,891.

*To all whom it may concern:*

Be it known that I, WILLIAM D. HAWLEY, of Syracuse, in the county of Onondaga and State of New York, have invented a certain new and useful Time-Record Sheet, of which the following is a specification.

My invention has for its object the production of a time-record sheet, which facilitates to a maximum the application of time-records thereto, and the reading of such records; and to this end, it consists in the novel features hereinafter set forth and claimed.

In describing this invention, reference is had to the accompanying drawing, illustrating one exemplification of said invention.

My record-sheet is provided with vertical elongated spaces or columns divided longitudinally forming divisions 1, 2 representing different portions, as day time and night time, of a predetermined working period, and also divided transversely into subdivisions representing shorter periods of time, each of said elongated spaces being of sufficient extent to receive a plurality of time-indicating impressions made at intervals during a predetermined working period to form a workman's time-record.

The longitudinal divisions of each elongated space or column are appropriately distinguished in any desirable manner, as by forming the night division 2 of a heavier shade or color than the day division 1, the night divisions in the illustrated exemplification of the invention having inclined parallel lines thereon which clearly distinguish them from the day divisions. Suitable words, as the abbreviations of the days of the week may be used to distinguish the respective elongated spaces from each other, and the words day and night may serve as captions to distinguish the divisions 1, 2 of said elongated spaces.

The means dividing the elongated spaces and their appropriately-distinguished divisions transversely into subdivisions are here shown as lines 3, forming hour subdivisions, dotted lines 4 dividing each hour space into fifteen minute subdivisions, and dots 5 forming five minute subdivisions, and dots 5 being arranged in vertical lines at the edges of the elongated spaces or columns for additionally distinguishing said elongated spaces from each other.

In the preferable form of my time-record sheet, the day subdivisions advance toward the bottom of the sheet, and the night subdivisions toward the top thereof. Suitable characters ordinarily used to indicate the hours of the day commencing with 6 A. M. are arranged on one margin of the sheet, and progress from the top downwardly, and similar characters commencing with 6 P. M. are arranged on the opposite margin and progress from the bottom of the sheet upwardly and form a continuation of the characters progressing downwardly. The indicating characters, arranged as described, designate parts of the divisions 1 and 2 corresponding to minor portions, as hours, of a day or working period, and denote that the time-indicating impressions made in one division, as 1, progress in one direction, and that such impressions made in the other division, as 2, progress in the opposite direction, and said characters serve to facilitate reading of the workman's time-records, especially when some of the time-impressions forming a single time-record are made in one division, as 1, and the balance of such impressions are made in the other division, as 2.

In the illustrated exemplification of my invention, characters indicating twelve consecutive hours of a day are disposed in a row at one side of the card at the outside of the elongated spaces thereof, the characters indicating the noon-hour being arranged in such row intermediate of the ends thereof, and characters indicating the remaining twelve consecutive hours of a day are disposed in a second row at the other side of the card and at the outside of said elongated spaces, the character indicating midnight being arranged in said second row, intermediate of the ends thereof, but to those skilled in the art it will be apparent that my invention is not limited to a time-card indicating all of the twenty-four hours of a day.

The lengthwise portions of the spaces representing the regular working time are preferably distinguished from other portions of said spaces by a distinguishing color, as for instance, the day divisions between 7 A. M. and 12 M., and 1 and 5 P. M. are of red, or other color, and the parts of said divisions between the hours 6 and 7 A. M., 12 M. and 1 P. M., and 6 P. M. are uncolored. Likewise, if the regular working hours are from 4 to 11 P. M. the day divisions between the transverse lines marking the hours 4 to 6 P. M. and the night divisions between the transverse lines marking the hours 6 and 11 P. M. would be differently colored than the parts of the day divisions representing the time between 6 A. M. and 4 P. M. and the portions of the night divisions representing the time between 11 P. M. and 6 A. M. Consequently, if the time impressions are placed on the record-sheet at the ends of the colored portions of the divisions 1, 2, it can be ascertained with minimum effort that the workman arrived and departed at the regular time. The colored portions of the divisions 1, 2 also aid in reading the "time out" and "overtime" records, as the "time out" records will be made on the colored portions, and the "overtime" records off said portions.

The time-record sheet illustrated shows that John Doe worked regularly, that is, from 7 A. M. to 12 M. every morning throughout the week, and also every afternoon from 1 to 5 P. M. with the exception of Thursday from 2 to 3 P. M., and that Monday he worked overtime from 5 to 6:15 P. M. and Friday from 6 to 8 P. M.

It will be noted that the night record is a continuation of the day record, and may be read without transferring from the bottom of the sheet to the top, thus obviating confusion of the divisions. For instance, the time-record for Monday on the sheet illustrated can be instantly read by following down the day division and up the night division, it being readily perceived when the bottom of the sheet is reached that the workman left at 6:15 P. M. Likewise, the overtime record of Friday night may be quickly read. It will also be noted that the predetermined working period during which the elongated spaces receive time-indicating impressions may be greater or less than twenty-four hours, that the divisions of each elongated space receive the impressions made during different portions of said working period, that each elongated space is of a breadth substantially twice that of the space occupied by one of the time-indicating impressions to permit two of such impressions to be made side by side, in such space, and that the transverse subdivisions of said elongated spaces and their divisions may correspond to intervals of time greater or less than five minutes.

Having thus fully described my invention, what I claim as new and desire to secure by Letters Patent, is:—

1. A workman's time-record sheet having an elongated blank space of sufficient extent to receive a plurality of time-indicating impressions, said space being of a breadth sufficient to receive two distinct time-indicating impressions side by side, and characters ordinarily used to indicate hours of a day, the same being arranged in two rows extending parallel to the length of such space, the characters in one row progressing in one direction, and those in the other row progressing in the opposite direction and forming a continuation of the characters in the first-mentioned row, said characters denoting that the time-indicating impressions made in said space during one portion of the working period progress in one direction toward one end of the space, and that such impressions made during another portion of the working period progress in the opposite direction toward the other end of said space, substantially as and for the purpose specified.

2. A workman's time-record sheet having an elongated blank space of sufficient extent to receive a plurality of time-indicating impressions, said space being of a breadth sufficient to receive two distinct time-indicating impressions side by side, and characters ordinarily used to indicate hours of a day, the same being arranged in two rows extending parallel to the length of the elongated space and outside of said space and at opposite sides thereof, the characters in one row progressing in one direction, and those in the other row progressing in the opposite direction and forming a continuation of the characters in the first-mentioned row, said characters denoting that the time-indicating impressions made in said space during one portion of the working period progress in one direction toward one end of the space, and that such impressions made during another portion of the working period progress in the opposite direction toward the other end of said space, substantially as and for the purpose specified.

3. A workman's time-record sheet having a plurality of elongated spaces each of sufficient extent to receive a plurality of time-indicating impressions, each of a breadth sufficient to receive two distinct time-indicating impressions side by side, a row of characters ordinarily used to indicate a plurality of consecutive hours of a portion of a day, said row extending parallel to the length of such spaces and the characters thereof progressing in one direction, and a second row of characters ordinarily used to indicate a plurality of consecutive hours of another portion of a day, the second row extending parallel to the length of such spaces, and the characters thereof progressing in the opposite direction and forming a continuation of the characters in the first-mentioned row, the characters of said rows denoting that the time-indicating impressions made in each of said spaces during one portion of the working period progress in one direction toward one end of the space, and that such impressions made during another portion of the working period progress in the opposite direction toward the other end of said space, substantially as and for the purpose specified.

4. A workman's time-record sheet having an elongated space of sufficient extent to receive a plurality of time-indicating impressions, said space being of a breadth sufficient to receive two distinct time-indicating impressions side by side, a row of characters ordinarily used to indicate twelve consecutive hours of a day, said row extending parallel to the length of such space and the characters thereof progressing in one direction, and a second row of characters ordinarily used to indicate twelve consecutive hours of a day, the second row extending parallel to the length of such space, and the characters thereof progressing in the opposite direction and forming a continuation of the characters in the first-mentioned row, the characters of said rows denoting that the time-indicating impressions made in said space during one portion of the working period progress in one direction toward one end of the space, and that such impressions made during another portion of the working period progress in the opposite direction toward the other end of said space, substantially as and for the purpose specified.

5. A workman's time-record sheet having an elongated space of sufficient extent to receive a plurality of time-indicating impressions, said space being of a breadth sufficient to receive two distinct time-indicating impressions side by side, and characters ordinarily used to indicate hours of a day, the same being arranged in two rows extending parallel to the length of such space, the characters in one row progressing in one direction, and those in the other row progressing in the opposite direction and forming a continuation of the characters in the first-mentioned row, the characters indicating the noon-hour being arranged in one of the rows intermediate of the ends thereof, and the characters of said rows denoting that the time-indicating impressions made in said space during one portion of the working period progress in one direction toward one end of the space, and that such impressions made during another portion of the working period progress in the opposite direction toward the other end of said space, substantially as and for the purpose specified.

6. A workman's time-record sheet having an elongated blank space of sufficient extent to receive a plurality of time-indicating impressions, said space being of a breadth sufficient to receive two distinct time-indicating impressions side by side, and characters ordinarily used to indicate hours of a day, the same being arranged in two rows extending parallel to the length of the elongated space and outside of said space and at opposite sides thereof, the characters in one row progressing in one direction, and those in the other row progressing in the opposite direction and forming a continuation of the characters in the first-mentioned row, the characters indicating the noon-hour being arranged in one of the rows intermediate of the ends thereof, and the characters indicating midnight being arranged in the other row intermediate of the ends thereof, and the characters of said rows denoting that the time-indicating impressions made in said space during one portion of the working period progress in one direction toward one end of the space, and that such impressions made during another portion of the working period progress in the opposite direction toward the other end of said space, substantially as and for the purpose specified.

7. A workman's time-record sheet having an elongated space of sufficient extent to receive a plurality of time-indicating impressions, said space being of a breadth sufficient to receive two distinct time-indicating impressions side by side, and characters ordinarily used to indicate hours of a day, the same being arranged in two rows extending parallel to the length of such space, the characters in one row progressing in one direction, and those in the other row progressing in the opposite direction and forming a continuation of the characters in the first-mentioned row, said characters denoting that the time-indicating impressions made in said space during one portion of the working period progress in one direction toward one end of the space, and that such impressions made during another portion of the working period progress in the opposite direction toward the other end of said space, each of a plurality of the portions of said space corresponding to the hours of the day, having transverse time-indicating subdivisions, substantially as and for the purpose specified.

8. A workman's time-record sheet having a plurality of elongated, appropriately-distinguished divisions, disposed side by side and of sufficient extent to receive a plurality of time-indicating impressions, one division receiving impressions made during a portion of the working period, and another division receiving impressions made during another portion of said period, and characters ordinarily used to indicate hours of a day, the same being arranged in two rows extending parallel to the length of such divisions, the characters in one row progressing in one direction, and those in the other row progressing in the opposite direction and forming a continuation of the characters in the first-mentioned row, said characters denoting that the time-indicating impressions made in one division progress in one direction, and those made in the other division progress in the opposite direction, substantially as and for the purpose specified.

9. A workman's time-record sheet having a plurality of elongated, appropriately-distinguished blank divisions, disposed side by side and of sufficient extent to receive a plurality of time-indicating impressions, one division receiving impressions made during a portion of the working period, and another division receiving impressions made during another portion of said period, and characters ordinarily used to indicate hours of a day, the same being arranged in two rows extending parallel to the length of the divisions and outside of said divisions and at the outer sides thereof, the characters in one row progressing in one direction, and those in the other row progressing in the opposite direction and forming a continuation of the characters in the first-mentioned row, said characters denoting that the time-indicating impressions made in one division progress in one direction, and those made in the other division progress in the opposite direction, substantially as and for the purpose specified.

10. A workman's time-record sheet having a plurality of elongated, appropriately-distinguished divisions, disposed side by side and of sufficient extent to receive a plurality of time-indicating impressions, one division receiving impressions made during a portion of the working period, and another division receiving impressions made during another portion of said period, a row of characters ordinarily used to indicate twelve consecutive hours of a day, said row extending parallel to the length of such divisions and the characters thereof progressing in one direction, and a second row of characters ordinarily used to indicate twelve consecutive hours of a day, the second row extending parallel to the length of such space, and the characters thereof progressing in the opposite direction and forming a continuation of the characters in the first-mentioned row, the characters of said rows denoting that the time-indicating impressions made in one division progress in one direction, and those made in the other division progress in the opposite direction, substantially as and for the purpose specified.

11. A workman's time-record sheet having a plurality of elongated, appropriately-distinguished divisions, disposed side by side and of sufficient extent to receive a plurality of time-indicating impressions, one division receiving impressions made during a portion of the working period, and another division receiving impressions made during another portion of said period, one of such divisions having a lengthwise portion thereof of a different color than another portion of said division, and time-indicating characters denoting a sequence of predetermined parts of the working period, said characters being arranged in two rows extending parallel to the length of such divisions, the characters in one row progressing in one direction, and those in the other row progressing in the opposite direction and forming a continuation of the characters in the first-mentioned row, said characters denoting that the time-indicating impressions made in one division progress in one direction, and those made in the other division progress in the opposite direction, substantially as and for the purpose specified.

In testimony whereof, I have hereunto signed my name in the presence of two attesting witnesses, at Syracuse, in the county of Onondaga, in the State of New York, this 5th day of October, 1905.

WILLIAM D. HAWLEY.

Witnesses:
S. DAVIS,
E. K. SEEMILLER.